US011721157B2

(12) United States Patent
Van Schothorst

(10) Patent No.: US 11,721,157 B2
(45) Date of Patent: Aug. 8, 2023

(54) FIRST DISPENSER MODULE, VENDING KIT COMPRISING SAID FIRST DISPENSER MODULE AND METHOD

(71) Applicant: Leonard Jakob Van Schothorst, Bodegraven (NL)

(72) Inventor: Leonard Jakob Van Schothorst, Bodegraven (NL)

( * ) Notice: Subject to any disclaimer, the term of this patent is extended or adjusted under 35 U.S.C. 154(b) by 72 days.

(21) Appl. No.: 17/620,996

(22) PCT Filed: Jun. 16, 2020

(86) PCT No.: PCT/NL2020/050385
§ 371 (c)(1),
(2) Date: Dec. 20, 2021

(87) PCT Pub. No.: WO2020/256543
PCT Pub. Date: Dec. 24, 2020

(65) Prior Publication Data
US 2022/0327884 A1  Oct. 13, 2022

(30) Foreign Application Priority Data

Jun. 20, 2019 (NL) ..................... 2023352
Oct. 3, 2019 (NL) ..................... 2023950

(51) Int. Cl.
*G07F 11/22* (2006.01)
*B65G 1/04* (2006.01)
(Continued)

(52) U.S. Cl.
CPC ............ *G07F 11/22* (2013.01); *B65G 1/0471* (2013.01); *B65G 1/08* (2013.01); *F25D 25/04* (2013.01);
(Continued)

(58) Field of Classification Search
CPC ...................................... G07F 11/22
See application file for complete search history.

(56) References Cited

U.S. PATENT DOCUMENTS 3,421,657 A * 1/1969 Larson ............... G07F 11/44
                                                    194/240
4,405,059 A    9/1983 Kull .............................. 221/129
(Continued)

FOREIGN PATENT DOCUMENTS

CN    101484926    7/2009    ............. G07F 11/26
CN    102804235    11/2012    ............. G07F 11/60
(Continued)

OTHER PUBLICATIONS

First Office Action issued in Chinese Patent Appln. Serial No. 202080053085.3, dated Oct. 21, 2022, with English translation, 23 pages.
(Continued)

*Primary Examiner* — Gene O Crawford
*Assistant Examiner* — Ayodeji T Ojofeitimi
(74) *Attorney, Agent, or Firm* — Hayes Soloway P.C.

(57) ABSTRACT

Disclosed is a first dispenser module with a product holder for holding a plurality of beverage cans and a dispensing mechanism for dispensing one beverage can of the plurality of beverage cans at a time in a dispensing direction from the product holder, wherein the product holder is arranged for holding the plurality of beverage cans with their central axes parallel to said product orientation direction. The dispensing mechanism has a retaining cam that is movable with at least a vector component in the production orientation direction between a retaining position for retaining the plurality of beverage cans and a release position for releasing the beverage cans from the product holder, wherein the retaining cam, in the retaining position, is arranged to be in the path
(Continued)

of the top rim or the bottom rim of one of the beverage cans in the dispensing direction.

19 Claims, 14 Drawing Sheets

(51) Int. Cl.
  *B65G 1/08* (2006.01)
  *F25D 25/04* (2006.01)
  *G07F 11/30* (2006.01)
  *G07F 11/42* (2006.01)
(52) U.S. Cl.
  CPC .............. *G07F 11/30* (2013.01); *G07F 11/42* (2013.01); *B65G 2201/0252* (2013.01)

(56) References Cited

U.S. PATENT DOCUMENTS

| | | | | |
|---|---|---|---|---|
| 4,809,879 | A | 3/1989 | Hanley | 221/125 |
| 5,150,817 | A | 9/1992 | Livingston | 221/81 |
| 8,087,541 | B2* | 1/2012 | Valota | G07F 11/42 |
| | | | | 221/175 |
| 8,973,782 | B2* | 3/2015 | Klier | G07F 11/34 |
| | | | | 221/209 |
| 9,038,852 | B2 | 5/2015 | Yasaka | G07F 11/60 |
| 9,275,508 | B1 | 3/2016 | Lavra et al. | G07F 11/005 |
| 2005/0167440 | A1 | 8/2005 | Huffer et al. | 221/92 |
| 2007/0289990 | A1* | 12/2007 | Artsiely | G07F 11/30 |
| | | | | 221/251 |
| 2010/0018989 | A1 | 1/2010 | Kraemer et al. | 221/199 |
| 2011/0011099 | A1* | 1/2011 | Linder | G07F 17/0071 |
| | | | | 62/251 |
| 2014/0367403 | A1 | 12/2014 | Carpentier et al. | |
| 2017/0284732 | A1 | 10/2017 | Cosgrove et al. | |

FOREIGN PATENT DOCUMENTS

| | | | |
|---|---|---|---|
| CN | 105980277 | 9/2016 | ............ B65H 1/00 |
| FR | 1298853 | 7/1962 | |
| JP | H11283098 | 10/1999 | ............ G07F 9/10 |
| WO | WO 02725552 | 3/2002 | ............ G06F 17/60 |
| WO | WO 2013/124757 | 8/2013 | ............ F25D 25/00 |
| WO | WO 2015/076949 | 5/2015 | ............ G06F 17/00 |
| WO | WO 2015/095669 | 6/2015 | ............ B65H 1/00 |

OTHER PUBLICATIONS

Office Action issued in Netherlands Patent Appln. Serial No. 2023352, dated Feb. 20, 2020, 9 pages.
International Search Report and Written Opinion issued in PCT/NL2020/050385, dated Sep. 17, 2020, 10 pages.
International Preliminary Report on Patentability issued in PCT/NL/2020/050385, dated Oct. 4, 2021, 12 pages.

* cited by examiner

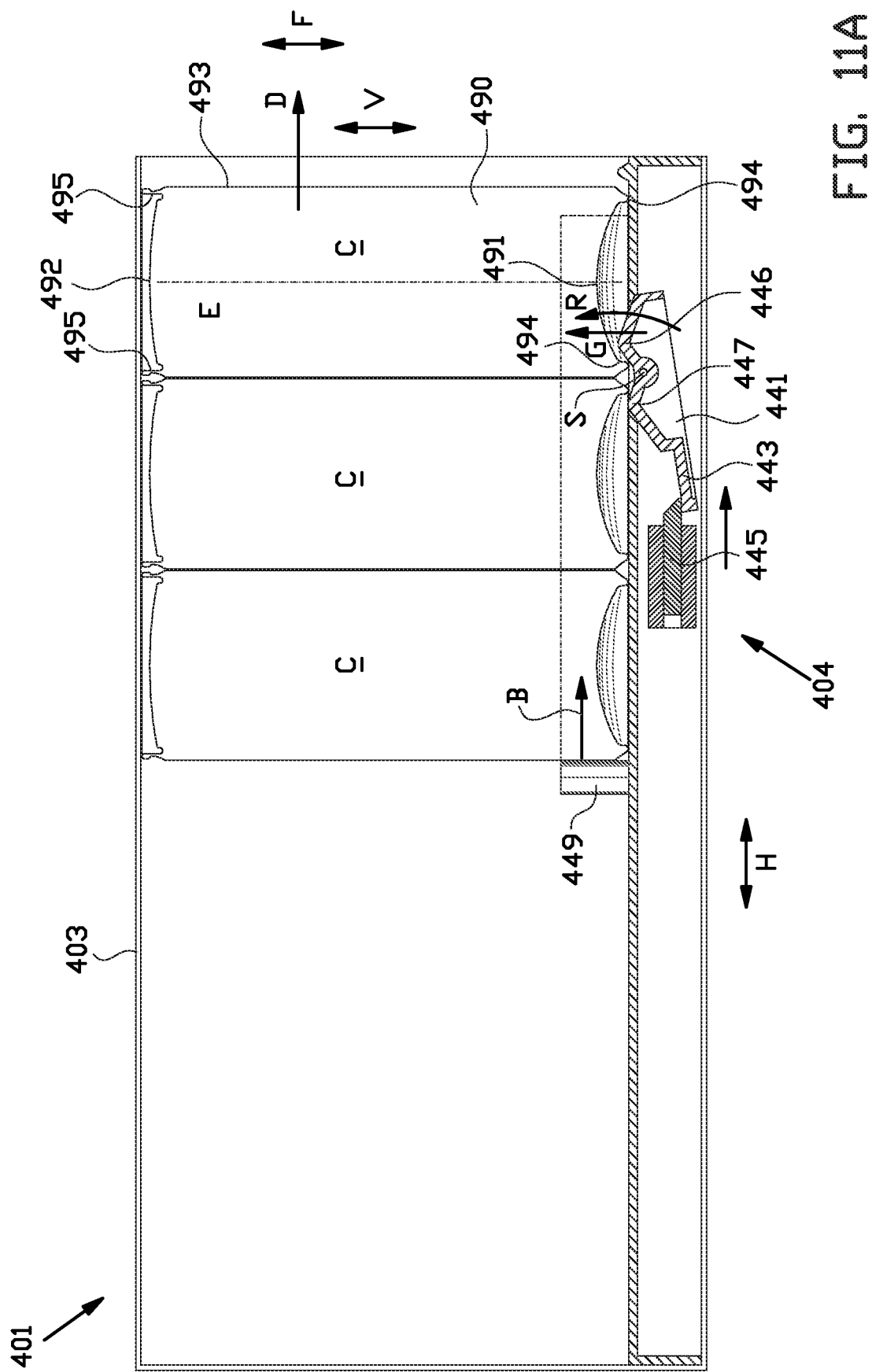

FIRST DISPENSER MODULE, VENDING KIT COMPRISING SAID FIRST DISPENSER MODULE AND METHOD

BACKGROUND

The invention relates to a first dispenser module, a vending kit comprising said first dispenser module and a method for dispensing one beverage can at a time.

WO 2015/076949 A1 discloses a vending kit that can be installed on an existing refrigerator to repurpose the refrigerator as a vending machine through which patrons can retrieve food items from the refrigerator and pay for their selections accordingly. The vending kit comprises a locking mechanism that can be installed between the door and the door frame of the refrigerator. The door is unlocked to validation of the credit card or successful login into a purchase account. The patron can subsequently open the door of the vending machine, select one or more food items, and close the door. An RFID reader can poll RFID tags still within the vending machine to identify one or more food items removed from the shelf.

U.S. Pat. No. 4,809,879 A discloses a vending machine suitable for dispensing articles of merchandise, such as beverage cans. The vending machine includes a vend unit that is suitable for placement in a small refrigerator and has a four delivery doors. The vend unit has a dispensing mechanism that comprises levers, slide members and blocking pivots that cooperate so that only one of the delivery doors can be opened at a time.

SUMMARY OF THE INVENTION

A disadvantage of the known vending kits is that they can not necessarily be fitted to each type of refrigerator as it would require modifications to adapt to the dimensions of the specific refrigerator. Moreover, the dispensing mechanism as disclosed in U.S. Pat. No. 4,809,879 A is relatively complex and consumes a lot of space. As a result, only four delivery doors can be fitted in the known vend unit.

The known vending kits would certainly not be optimized for the various sizes of home-appliance refrigerators. Yet, such home-appliance refrigerators are found in almost every small to medium sized office building for common use by the employees. These office refrigerators are hardly ever used up to their full capacity. Consequently, a lot of the energy consumption is essentially wasted. On the other hand, it has been found that in these small to medium sized offices, there is a relatively small demand for refrigerated vending machines.

In this office scenario, the retrofitting the known vending kit to the office refrigerator would render the office refrigerator unsuitable for common use by the employees. Purchasing a separate display refrigerator is commercially unviable for the relatively small demand and would waste even more energy.

It is an object of the present invention to provide a first dispenser module, a vending kit comprising said first dispenser module and a method for dispensing one beverage can at a time, wherein the first dispenser module can meet a relative small demand in a commercially viable and/or environmentally friendly manner.

According to a first aspect, the invention provides a first dispenser module with a product holder for holding a plurality of beverage cans and a dispensing mechanism that is coupled to the product holder for dispensing one beverage can of the plurality of beverage cans at a time in a dispensing direction from the product holder, wherein each beverage can has a cylindrical body with a top, a bottom and a central axis extending at the heart of the cylindrical body between the top and the bottom, wherein each beverage can further comprises a top rim and a bottom rim at the top and the bottom, respectively, wherein the product holder defines a product orientation direction and is arranged for holding the plurality of beverage cans with their central axes parallel to said product orientation direction, wherein the dispensing mechanism comprises a retaining cam that is movable with at least a vector component in the production orientation direction between a retaining position for retaining the plurality of beverage cans in the product holder and a release position for releasing said one beverage can from the product holder, wherein the retaining cam, in the retaining position, is arranged to be in the path of the top rim or the bottom rim of one of the beverage cans in the dispensing direction.

The first dispenser module can be placed in the thermally insulated compartment of a refrigerator. Because of the modular configuration, a number of first dispenser modules can be arranged side-by-side to optimize the vending space in the refrigerator.

By having a dispensing mechanism that is coupled to the product holder, the first dispenser module can be operated independently of the refrigerator. In particular, the dispensing mechanism can be configured to operate independently from the door of the refrigerator. Hence, the refrigerator itself is still freely accessible and can still be used for other purposes, such as for common use by office employees. By repurposing at least a part of the refrigerator as vending machine, the capacity of its thermally insulated compartment can be used more efficiently. Moreover, because the first dispenser module is placed inside the thermally insulated compartment, it can be cooled by the refrigerator. Hence, the vending kit does not require an expensive cooling system and/or insulation. Consequently, the first dispenser module can be commercially attractive for low volume vending applications, i.e. in small to medium sized companies.

Because of the narrow fit of the beverage can in the product holder, it can be very difficult, if not impossible, to tilt the beverage can to such an extent that the top rim or the bottom rim can clear the retaining cam. Hence, the beverage cans can be securely retained in the product holder merely by retaining or engaging the beverage can at the top rim or the bottom rim.

Moreover, by engaging and/or retaining the beverage can only at the top or the bottom, the first dispenser module can have a relatively narrow width compared to the embodiments in which the dispensing mechanism is located at least partially at the side of the product holder. In case of a modular arrangement with several dispenser modules arranged adjacent to each other, it will be clear that the space saved by placing the dispensing mechanism underneath the product holder allows for one or more additional dispenser modules to be fitted—widthwise—in the same space, thereby increasing the commercial viability of the concept.

In one embodiment the bottom of each beverage can forms a bottom cavity, wherein the bottom rim extends circumferentially around said bottom cavity, wherein the retaining cam, in the retaining position, is arranged to extend into the bottom cavity of one of the beverage cans such that the retaining cam is in the path of the bottom rim of said one beverage can in the dispensing direction. The bottom cavity is typically slightly deeper, i.e. because of the dome shape thereof, than the top cavity. Hence, the retaining cam can be moved deeper into said bottom cavity to more securely engage and/or retain the beverage can.

Alternatively, the top of each beverage can forms a top cavity, wherein the top rim extends circumferentially around said top cavity, wherein the retaining cam, in the retaining position, is arranged to extend into the top cavity of one of the beverage cans such that the retaining cam is in the path of the top rim of said one beverage can in the dispensing direction. The same principle may be applied to the top rim, provided that there is sufficient space in the top cavity to securely engage and/or retain the beverage can.

In another preferred embodiment thereof the retaining cam is biased to return from the release position into the retaining position when said one product has been dispensed. The automatic return to the retaining position can prevent that a second product is inadvertently dispensed after the dispensing of said one product.

Preferably, the retaining cam comprises an auto-return cam or slope that is arranged in the dispensing direction in the path of a next product of the plurality of products in the product holder, wherein the auto-return cam or slope is arranged to force the retaining cam to return from the release position towards and/or into the retaining position when the next product advances in the dispensing direction into contact with and across the auto-return cam or slope. Consequently, only one beverage can is released at a time as the next beverage can automatically forces the retaining member to return to the retaining position.

In another preferred embodiment the product holder has a width that is arranged to hold the plurality of products in a single file in the dispensing direction, wherein the dispensing mechanism fits completely within the width of the product holder. Hence, the dispenser module can be more compact compared to the embodiments in which the dispensing mechanism is located at least partially at the side of the product holder. In case of a modular arrangement with several dispenser modules arranged adjacent to each other, it will be clear that the space saved by placing the dispensing mechanism underneath the product holder allows for one or more additional dispenser modules to be fitted—width-wise—in the same space.

In another embodiment the dispensing mechanism further comprises a blocking member that is movable between a blocking position for blocking the movement of the retaining cam from the retaining position into the release position and an unblocking position for allowing the movement of the retaining cam from the retaining position into the release position. The blocking member can be controlled in response to a payment at a payment module to momentarily move into the unblocking position.

Preferably, the blocking member can be an electronic actuator, preferably a solenoid. The blocking member can thus be electronically controlled, i.e. in response to an electronic signal received from the payment module.

In a further embodiment, the dispensing mechanism further comprises a biasing member for biasing the plurality of products in the dispensing direction. Preferably, the biasing member is a spring. By urging the plurality of products in the dispensing direction towards and/or against the dispensing mechanism, it can be ensured that a product is dispensed for each payment until the product holder is empty.

In another embodiment the product orientation direction is vertical or substantially vertical. Hence, multiple dispenser modules can be conveniently placed side-by-side without consuming a lot of space. Moreover, the beverage cans can be presented in a commercially attractive, upright orientation.

In another embodiment the product holder is arranged to prevent removal of the plurality of beverage cans in all directions but the dispensing direction. Hence, unauthorized access to the products, i.e. access without payment, can be prevented.

In another embodiment the product holder is provided with an enclosure that encloses the plurality of beverage cans and a dispensing opening in said enclosure for dispensing said one product in the dispensing direction. The enclosure can effectively contain the plurality of products. Preferably, the enclosure is open in the dispensing direction only so that the products can be removed from the product holder only in the dispensing direction.

According to a second aspect, the invention provides a vending kit for a refrigerator, wherein the vending kit comprises the first dispenser module according to any one of the aforementioned embodiments.

The vending kit comprises the aforementioned first dispenser module and thus has the same technical advantages which, for reasons of conciseness, will not be repeated hereafter.

Preferably, the first dispenser module is insertable into and removable from the vending kit like a cartridge. Hence, instead of refilling an empty first dispenser module, the empty first dispenser module may be easily replaced with a full first dispenser module. The first dispenser module may further comprise one or more connectors or connection members for connection to a control unit of the vending kit or directly to a payment module or wireless communication unit to allow for the first dispenser module to be operational as soon as it is inserted into an open slot of the vending kit.

In another embodiment, the vending kit comprises one or more further dispenser modules, wherein the one or more further dispenser modules are arranged to be placed adjacent to the first dispenser module in a horizontal direction and/or a vertical direction. The one or more further dispenser modules can have the same or substantially the same features as claimed in relation to the first dispenser module. These one or more further dispenser modules can thus be operated in the same or substantially the same way as the first dispenser module to dispense the same products or a different type or brand of products. By cleverly arranging the dispenser modules side-by-side and/or on top of each other, the available space in the thermally insulated compartment of the refrigerator can be used optimally.

According to a third aspect, the invention provides a refrigerator fitted with the vending kit according to the second aspect of the invention.

According to a third aspect, the invention provides a method for dispensing one beverage can at a time from the first dispenser module according to any one of the embodiment of the first aspect of the invention, wherein the method comprises the step of retaining one of the beverage cans at the top or the bottom of said one beverage can.

The aforementioned method relates to the practical implementation of the first dispenser module according to the first aspect of the invention and—as such—has the same technical advantages, which will not be repeated hereafter.

In one embodiment said one beverage can is retained at the bottom of said one beverage can.

Alternatively, said one beverage can is retained at the top of said one beverage can.

According to fourth aspect, the invention provides a method for vending a plurality of beverage cans from a first dispenser module with the use of a vending kit according to any one of the embodiments of the second aspect of the invention, wherein the method comprises the steps of inserting the first dispenser module into and removing the first dispenser module from the vending kit like a cartridge.

The aforementioned method relates to the practical implementation of the vending kit according to the second aspect of the invention and—as such—has the same technical advantages, which will not be repeated hereafter.

In another embodiment of the method the vending kit comprises one or more further dispenser modules, wherein the method comprises the step of placing one or more of the further dispenser modules adjacent to the first dispenser module in a horizontal direction and/or a vertical direction.

In another embodiment of the method the thermally insulated compartment of the refrigerator comprises two mutually facing sidewalls and a plurality of shelves extending in a horizontal direction between said sidewalls to divide the thermally insulated compartment in a plurality of sections, wherein the number of the one or more further dispenser modules is chosen such that the group of the first dispenser module and the one or more further dispenser modules fits in one of said sections.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which:

FIGS. 11A-11G show side views in cross section of a further alternative vending kit according to a fourth embodiment of the invention.

DETAILED DESCRIPTION OF THE INVENTION

Figure 1:
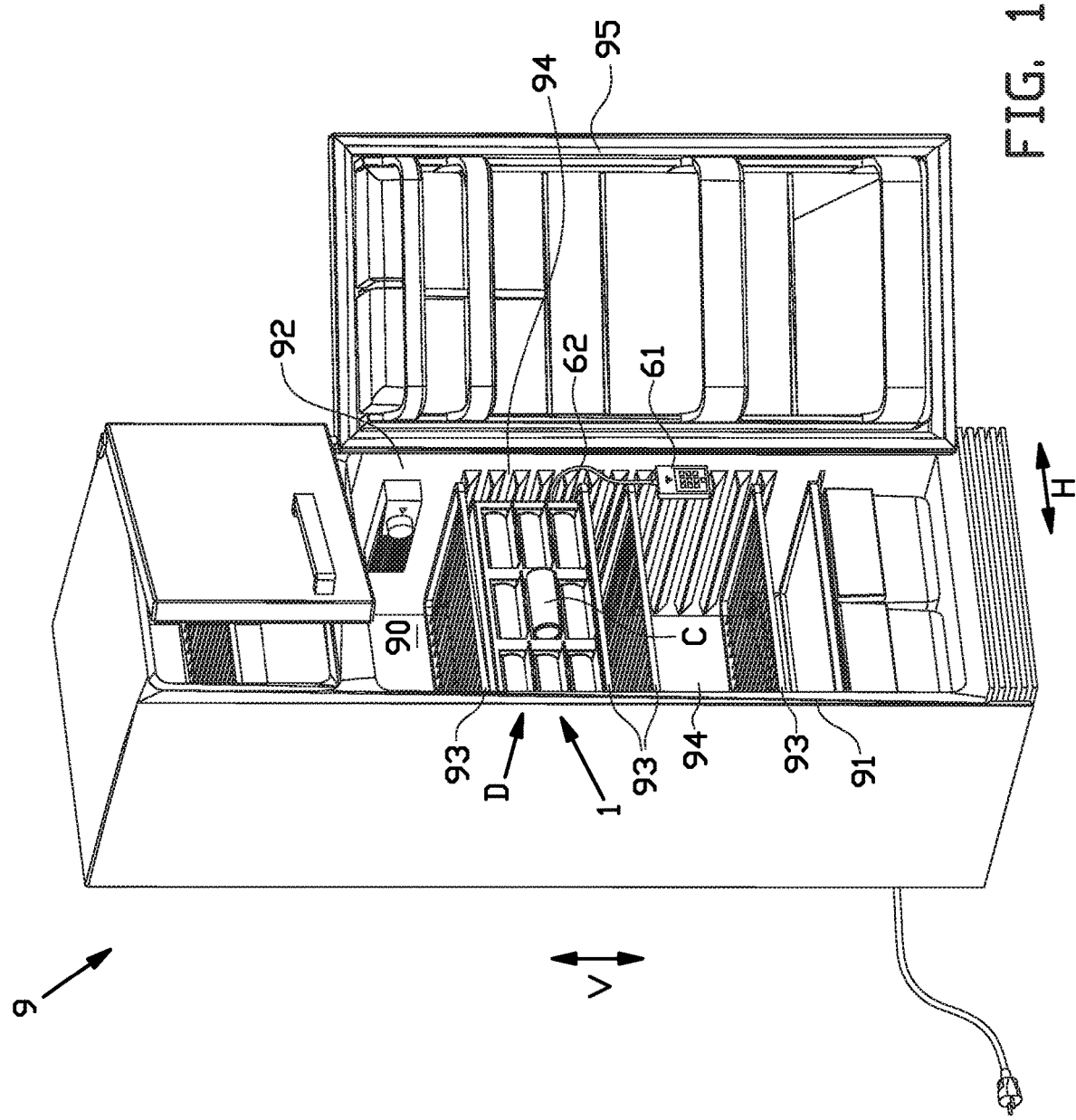
FIG. 1 shows an isometric view of a refrigerator with a vending kit according to a first embodiment of the invention.

FIG. 1 shows a vending kit 1 according to a first embodiment of the invention, for repurposing at least a part of a refrigerator 9 as a vending machine.

The refrigerator 9 has a thermally insulated compartment 90 defined by two sidewalls 91, 92, a rear wall, a top wall and a bottom wall. The refrigerator 9 further comprises a plurality of shelves 93 which divide the compartment 90 into sections 94. The refrigerator 9 is further provided with a door 95 that provides access to the compartment 90. The refrigerator 9 is a non-commercial, home-appliance type refrigerator. Such a refrigerator 9 is typically closed and therefore unsuitable for commercial display purposes. This type of refrigerator is often found in small to medium sized offices for common or public use by the office employees.

As shown in FIG. 1, the vending kit 1 is arranged to be placed into one of said sections 94. Hence, the vending kit 1 is dimensioned to fit in a vertical direction V between two shelves 93 and in the horizontal direction H between the two sidewalls 91, 92. Also, the depth of the vending kit 1 is adapted to fit in a standard refrigerator depth. In the configuration as shown, the vending kit 1 occupies less than half of the compartment 90 of the refrigerator, in particular less than a quarter.

Figure 2:
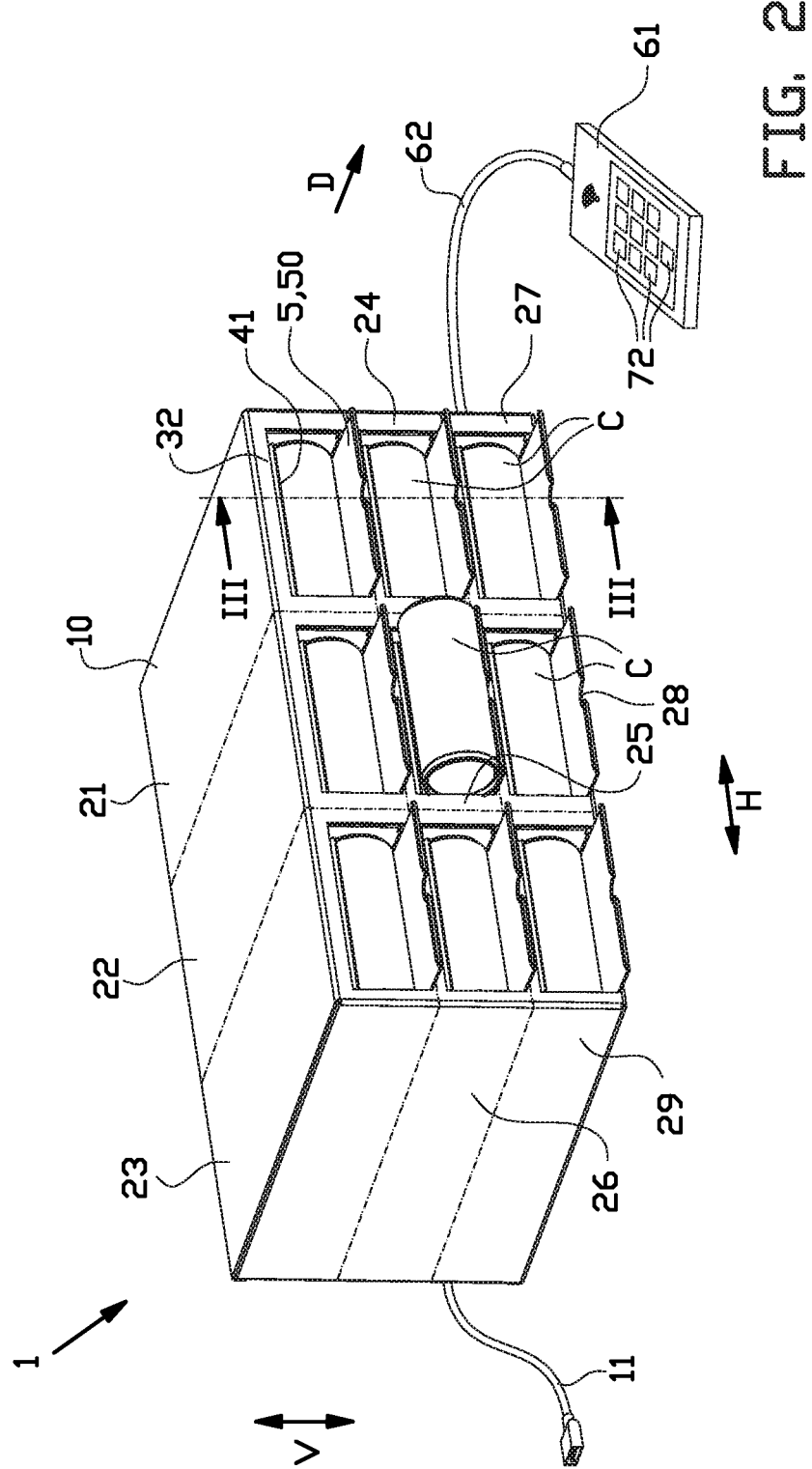
FIG. 2 shows an isometric view of the vending kit according to FIG. 1.
Figure 3:
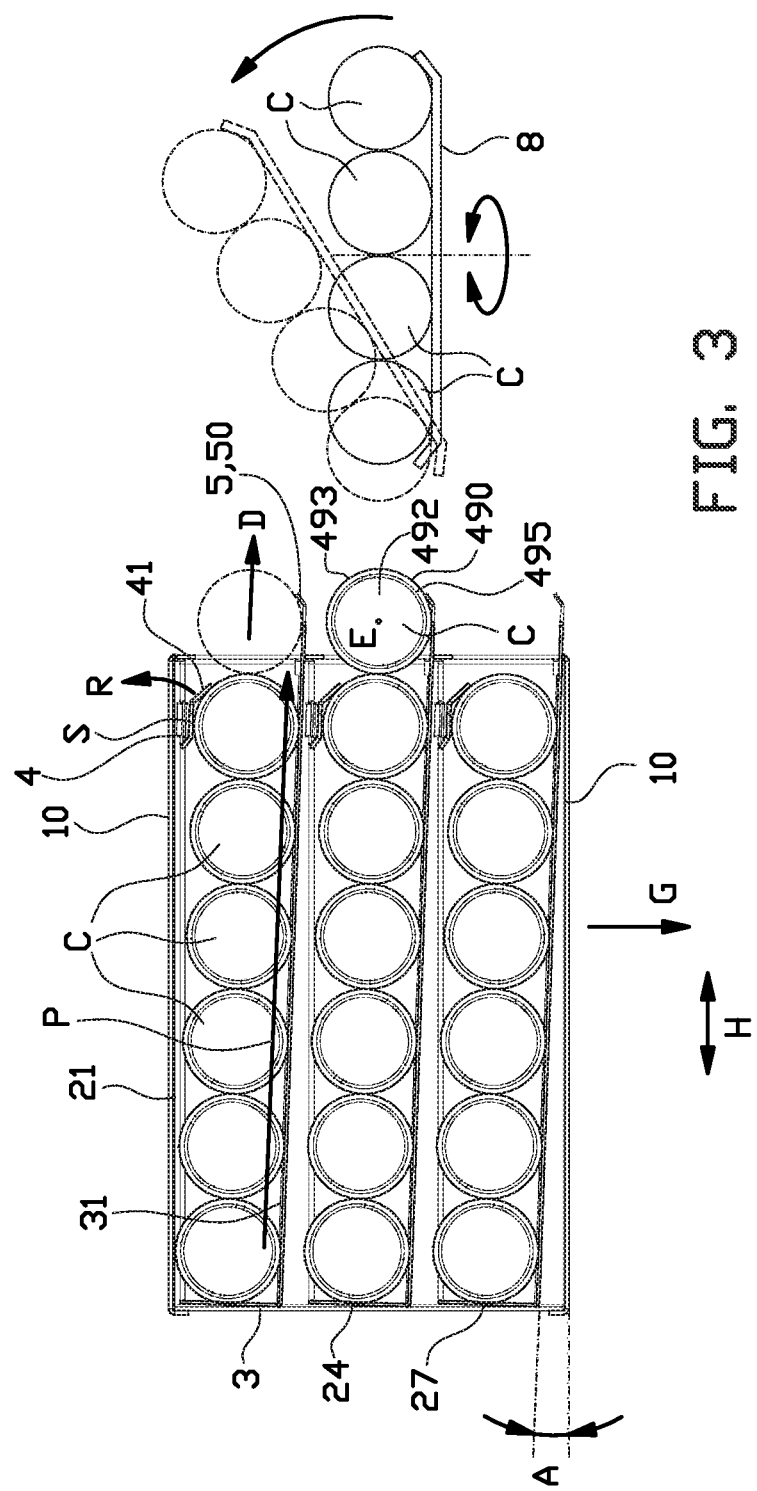
FIG. 3 shows a side view in cross section of the vending kit according to the line III-III in FIG. 2.
Figure 4:
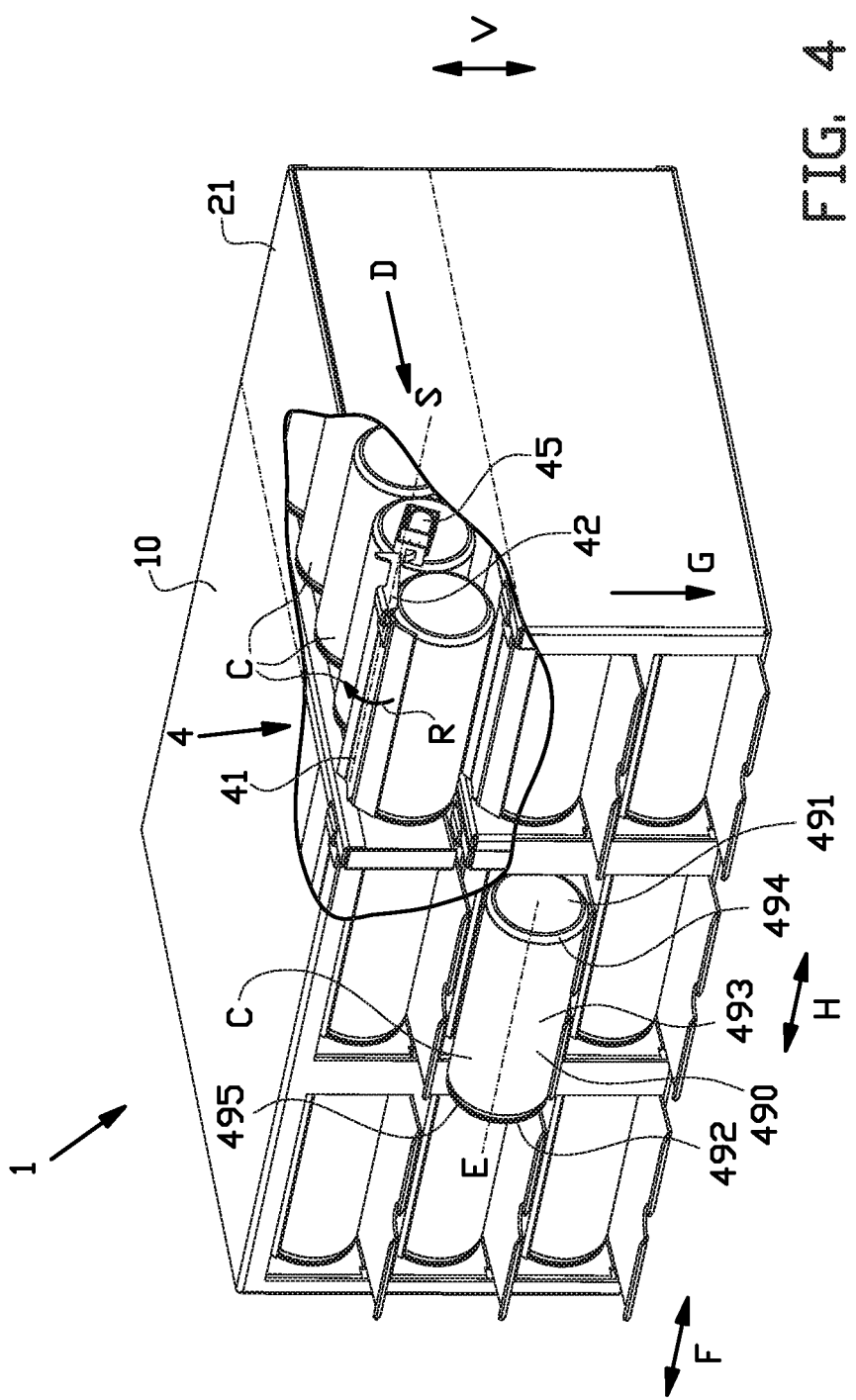
FIG. 4 shows another isometric view of the vending kit according to FIG. 2, with the housing partially broken away to expose the internal mechanism of the vending kit.
Figure 5:
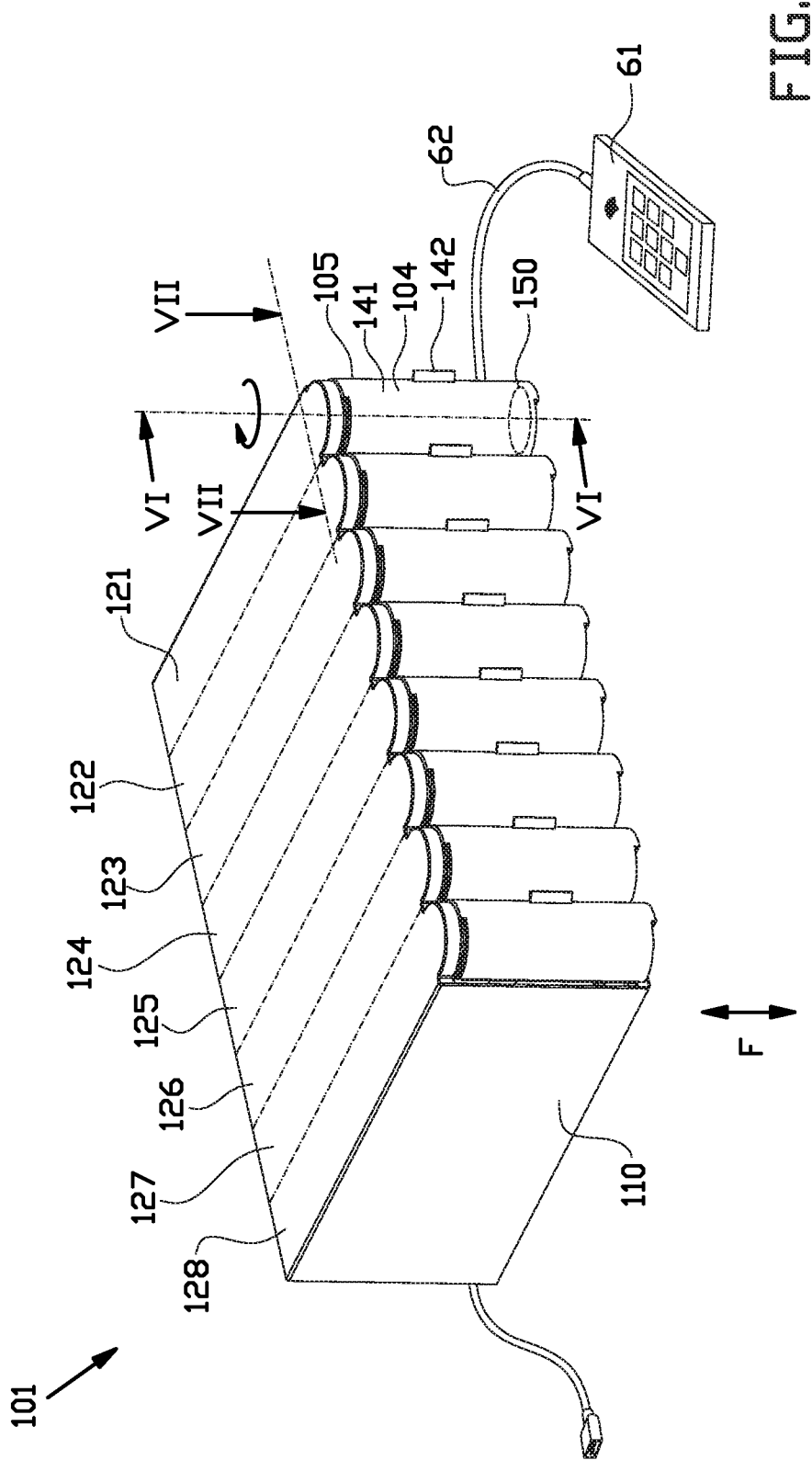
FIG. 5 shows an isometric view of an alternative vending kit according to a second embodiment of the invention for use in the refrigerator of FIG. 1.

FIGS. 2-4 show the vending kit 1 in more detail. As best seen in FIG. 2, the vending kit 1 comprises a first dispenser module 21 that is arranged to be placed in the thermally insulated compartment 90 of the refrigerator 9. In this example, the vending kit 1 comprises one or more further dispenser modules 22-29 which are placed adjacent to the first dispenser module 21 in the horizontal direction H and the vertical direction V. In particular, the group of the first dispenser module 21 and the one or more further dispenser modules 22-29 are arranged in a matrix of three rows and three columns. In this example, the one or more further dispenser modules 22-29 have the same or substantially the same features a described hereafter in relation to the first dispenser module 21.

As shown in FIGS. 3 and 4, the first dispenser module 21 comprises a product holder 3 for holding a plurality of products C and a dispensing mechanism 4 for dispensing one of the products C from the plurality of products C from the product holder 3 in a dispensing direction D. In this exemplary embodiment, the products C are beverage cans C, in particular soda beverage cans C.

As best seen in FIG. 4, such beverage cans C typically have cylindrical or substantially cylindrical body 490 with a bottom 491, a top 492 and a cylindrical wall 493 extending between the bottom 491 and the top 492. Each beverage can C further has a cylindrical or central axis E extending at the center or the heart of the cylindrical body 490 between the bottom 491 and the top 492. The product holder 3 defines a product orientation direction F for holding the beverage cans C in a chosen orientation. The cylindrical wall 493 is relatively thin and weak, while the bottom 491 and the top 492 of the beverage can C are reinforced. In particular, the bottom 491 of the beverage can C is formed by a concave or dome-shaped bottom surface 491 that forms a bottom cavity underneath the beverage can C. Said bottom cavity is bound by a circumferentially extending flange, seam or bottom rim 494 that, together with the concave bottom surface 491, provides rigidity to the bottom 491 of the can C. A similar circumferentially extending flange, seam or top rim 495 is formed at the top 492 of the beverage can C.

In this example, the product holder 3 is arranged for supporting the beverage cans C in a lying orientation, i.e. with the cylindrical or central axis E thereof parallel or substantially parallel to the horizontal direction H and transverse or perpendicular to the dispensing direction D. In other words, in this exemplary embodiment, the product orientation direction F is horizontal or substantially horizontal.

As shown in FIG. 3, the product holder 3 is arranged for holding the products C in a single file. In particular, the product holder 3 comprises one or more guides 31 for guiding the products C along a guide path P parallel to the dispensing direction D. Optionally, the one or more guides 31 can be arranged at an angle A to the horizontal direction H, declining in the dispensing direction D, to allow for the products C to move in the dispensing direction D mainly or solely under the influence of gravity (the gravitational force is schematically depicted in FIG. 3 with arrow G). Note that the movement under the influence of gravity is particularly effective in combination with beverage cans C rolling in the lying configuration over the one or more guides 31.

The product holder 3 is provided with an enclosure 10 that encloses the plurality of products C and a dispensing opening 32 in said enclosure 10 for dispensing said one product C in the dispensing direction D. In this example, the enclosure 10 is open in the dispensing direction D only. In this case, the enclosure 10 is part of a common housing 10 that contains the first dispenser module 21 and the one or more further dispenser modules 22-29. Hence, the group of dispenser modules 21-29 can be handled as a single package or unit. Preferably, the outer dimensions of the common housing 10 are adapted to fit in one of the sections 94 of the refrigerator 9 of FIG. 1.

As best seen in FIG. 4, the dispensing mechanism 4 is coupled or connected to the product holder 3 to operate relative to said product holder 3. Hence, the dispensing mechanism 4 can be operated independently of the refrigerator 9 or the door 95 of the refrigerator 9 in FIG. 1. Preferably, the dispensing mechanism 4 is physically or mechanically coupled to the product holder 3. In the context of this invention, the term 'mechanical coupling' is to be interpreted as the joining of two or more elements by mechanical fasteners such as bolts, rivets, screws. The term 'physically coupled' is to be interpreted as the joining of two or more elements through direct or indirect contact, i.e. by adhesives, welding or form-lock. In this exemplary embodiment, the dispensing mechanism 4 comprises a retaining member 41 that is movable between a retaining position for retaining the plurality of products C in the product holder 3 and a release position for releasing said one product C from the product holder 3. The retaining member 41 is formed as a lever that is rotatable (see arrow R) about a rotation axis S between the retaining position and the release position. The retaining member 41 is biased to return from the release position into the retaining position when said one product C has been dispensed. The biasing is the result of the retaining member 41 having its center of weight predominantly at a side of the rotation axis S that promotes its return to the retaining position.

The dispensing mechanism 4 further comprises a blocking member 45 that is movable between a blocking position for blocking the movement of the retaining member from the retaining position into the release position and an unblocking position for allowing the movement of the retaining member 41 from the retaining position into the release position. The blocking member 45 may block the retaining member 41 directly, i.e. through direct contact. In this exemplary embodiment, the dispensing mechanism 4 comprises an arm 42 that is coupled to the retaining member and that extends from the retaining member 41 towards the blocking member 45. In this case, the blocking member 45 is arranged for indirectly blocking the movement of the retaining member 41 through contact with the arm 42.

Preferably, the blocking member 45 is an electronic actuator, i.e. an actuator that can be controlled by electronic signals. In this exemplary embodiment, the blocking member 45 comprises a blocking pin with a latch-style blocking end. Said blocking pin is actuated by a solenoid.

As best seen in FIGS. 2 and 3, the first dispenser module 21 further comprises a collection member 5 in front of the product holder 3 in the dispensing direction D. The collection member 5 defines a collection area 50 for supporting said one product C after it has been dispensed from the product holder 3. Said one product C can then be collected from said collection area 50. In this exemplary embodiment, the collection area 50 is formed as a tray.

Figure 10:
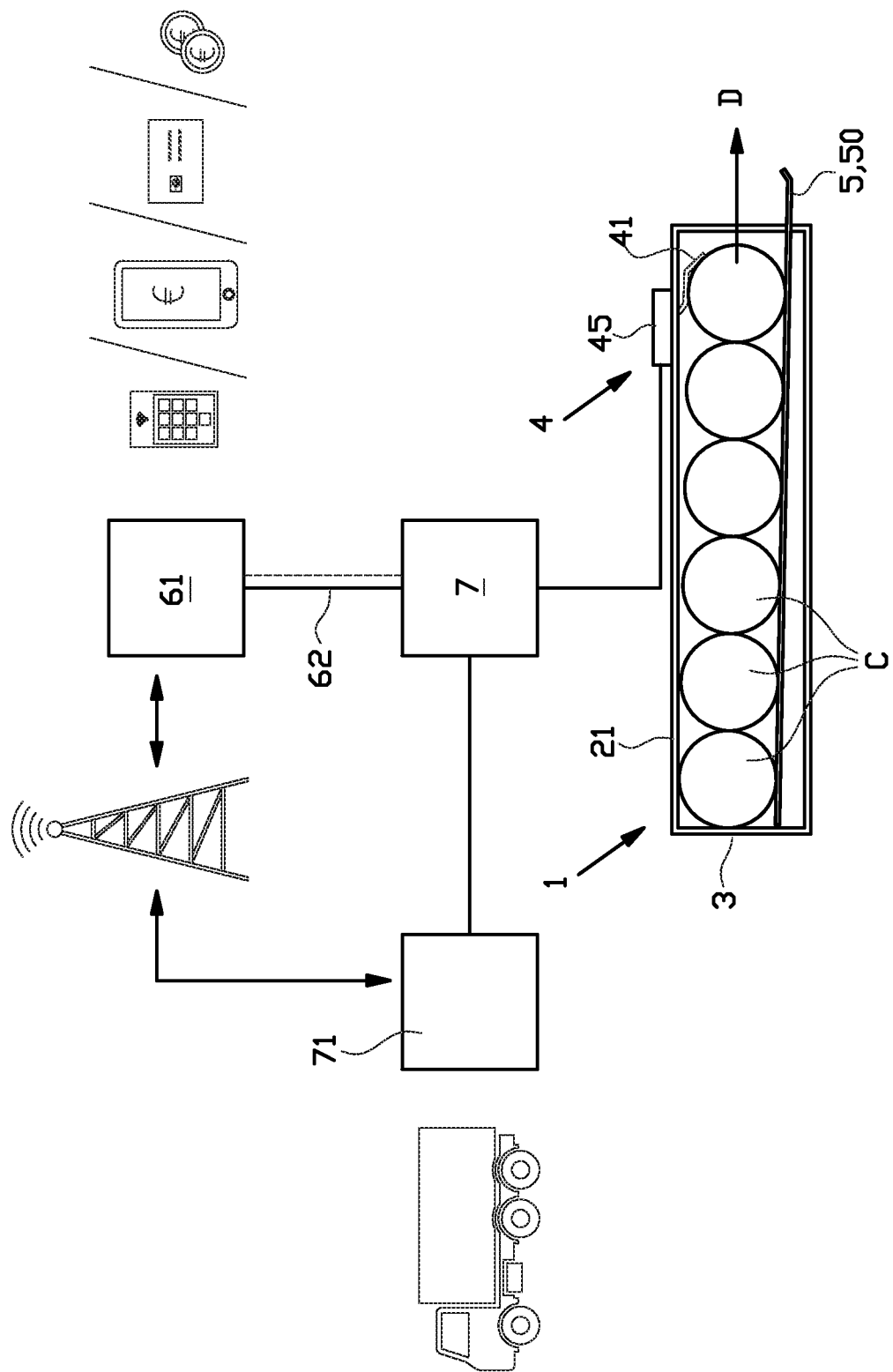
FIG. 10 schematically shows the operational components of the vending kit according to the invention.

The first dispenser module 21 is connectable to a payment module 61. As schematically shown in FIG. 10, the vending kit 1 may be provided with a payment module 61 of its own or it may be arranged for communication with an external payment module 61, i.e. a mobile device. The vending kit 1 is provided with a connection member 62 for connection to the payment module 61. Said connection member 62 may be an electronic communication cable or a wireless communication unit. In case of the electronic communication cable, the payment module 61 can be physically connected to the rest of the vending kit 1. The payment module 61 is then placed in the compartment 90 of the refrigerator 9 together with the first dispenser module 21 or it may be placed on an external surface of the refrigerator 9 with the cable extending through the seals of the refrigerator 9 into the compartment 90. In the case of the wireless communication unit, a connection can be established between the vending kit 1 and an external device, i.e. a mobile device, via a suitable communication protocol, i.e. Wi-Fi or Bluetooth, or indirectly via a telecom network. The mobile device may be provided with an app to process electronic payments.

The payment module 61 itself may be a coin slot module for receiving cash payments, a card reader module for processing card payments or a mobile device for processing electronic payments.

As schematically shown in FIG. 10, the vending kit 1 comprises a control unit 7 that is operationally connected to the dispensing mechanism 4 of the first dispenser module 21 and the payment module 61. The control unit 7 is arranged for receiving, processing, storing and/or sending signals, i.e. for receiving a signal indicative of a successful payment from the payment module and for sending a control signal to the dispensing mechanism 4 to dispense one product C at a time in response to the payment at the payment module.

As schematically shown in FIG. 10, the vending kit 7 may further be provided with a memory 71 for storing information about the inventory of the first dispenser module 21 and/or the one or more further dispenser modules 22-29. Said information may be used to keep inventory and to send signals to a supplier when one or more of the dispenser modules 21-29 requires replenishment.

As shown in FIG. 2, the vending kit 1 may further comprise one or more selection members 72 for selecting one of the dispenser modules 21-29 for dispensing. The selection can for example be made on the payment module 61. Alternatively, a plurality of selection members 72 may be provided at or near the respective dispenser modules 21-29.

FIG. 3 further shows a tool 8 that can be used during replenishment for loading and unloading of the dispenser modules 21-29. The tool 8 is formed as a tray that can receive and hold cans C. The cans C supported on the tray can be loaded simultaneously into one of the dispenser modules 21-29 by tilting the tray until the cans C roll from the tray onto the collection area 50 of the respective dispenser module 21-29 and into the product holder 3. For this purpose, the vending kit 1 can be switched into a replenishment mode in which the retaining members 41 of the respective dispenser modules 21-29 are no longer blocked and the cans C can be freely loaded and unloaded. The tool 8 can further be used to unload any remaining cans C from one of the dispenser modules 21-29. The unloaded cans C are then replenished with new cans C and the tool 8. The tool 8 can subsequently be positioned relative to the vending kit 1 such that the cans C can be loaded according to the 'first in-first out' principle. In particular, the tool 8 is reversible about a vertical reversing axis and can be loaded and unloaded from both sides.

Alternatively, the dispenser module 21-29 of the vending kit 1 are arranged to be insertable into and removable from the vending kit like a cartridge. Hence, instead of refilling an empty dispenser module 21-29, the empty dispenser module 21-29 may be easily replaced with a full dispenser module 21-29. The dispenser module 21-29 may further comprise one or more connectors or connection members for connection to the control unit 7 of the vending kit 1 or directly to the payment module or a wireless communication unit to allow for the dispenser modules 21-29 to be operational as soon as they are inserted into an open slot of the vending kit 1.

Figure 6:
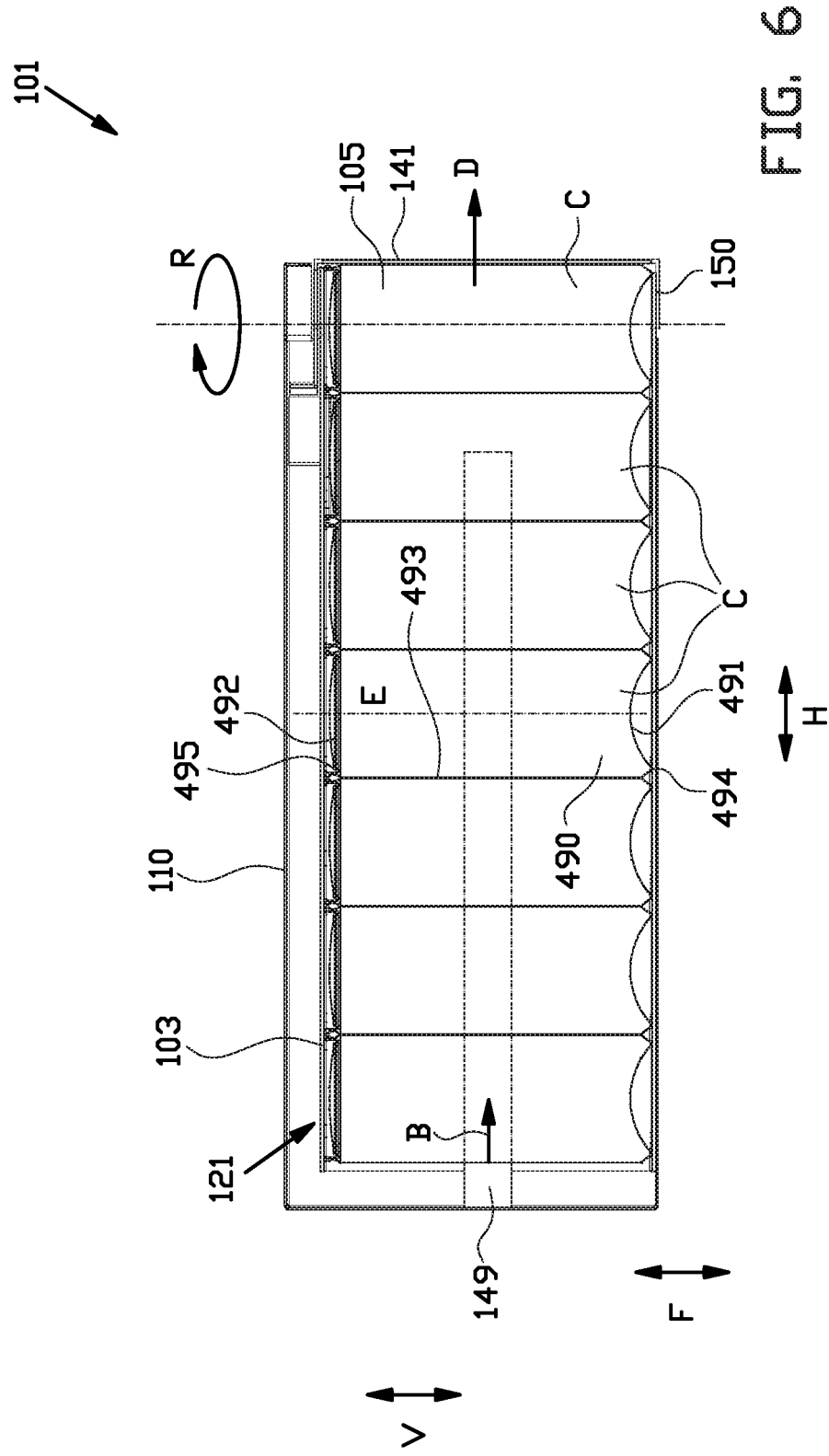
FIG. 6 shows a side view in cross section of the alternative vending kit according to the line VI-VI in FIG. 5.

FIGS. 5, 6, 7 and 9B show an alternative vending kit 101 according to a second embodiment of the invention. The alternative vending kit 101 differs from the previously discussed vending kit in that it features a first dispenser module 121 and one or more further dispenser modules 122-128 that hold the products C in a vertical or upright orientation. In particular, FIG. 6 shows that each dispenser module 121 has a product holder 103 that holds the products C, in this example beverage cans C, in the upright orientation, i.e. with the cylindrical axis of the beverage can C parallel or substantially parallel to the vertical direction V. As such, the products C are not likely to be dispensed solely under the influence of gravity. Hence, the alternative vending kit 101 comprises a dispensing mechanism 104 that includes a biasing member 149, preferably a constant-force spring, that is arranged to exert a biasing force B onto the products C in the dispensing direction D, thereby urging said products C to move or advance in the dispensing direction D when allowed to do so.

Figure 7:
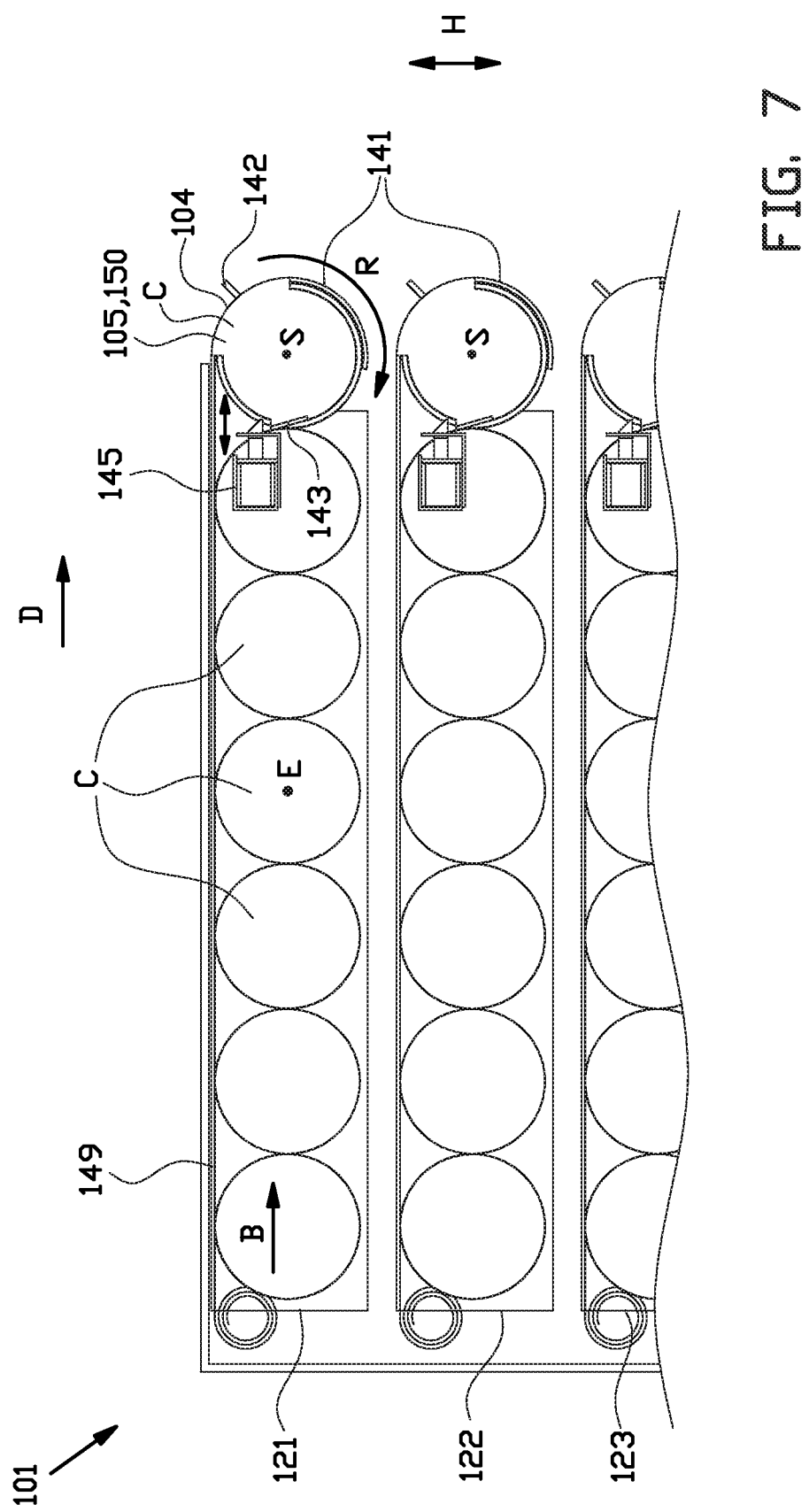
FIG. 7 shows a top view in cross section of the alternative vending kit according to the line VII-VII in FIG. 5.
Figure 9:
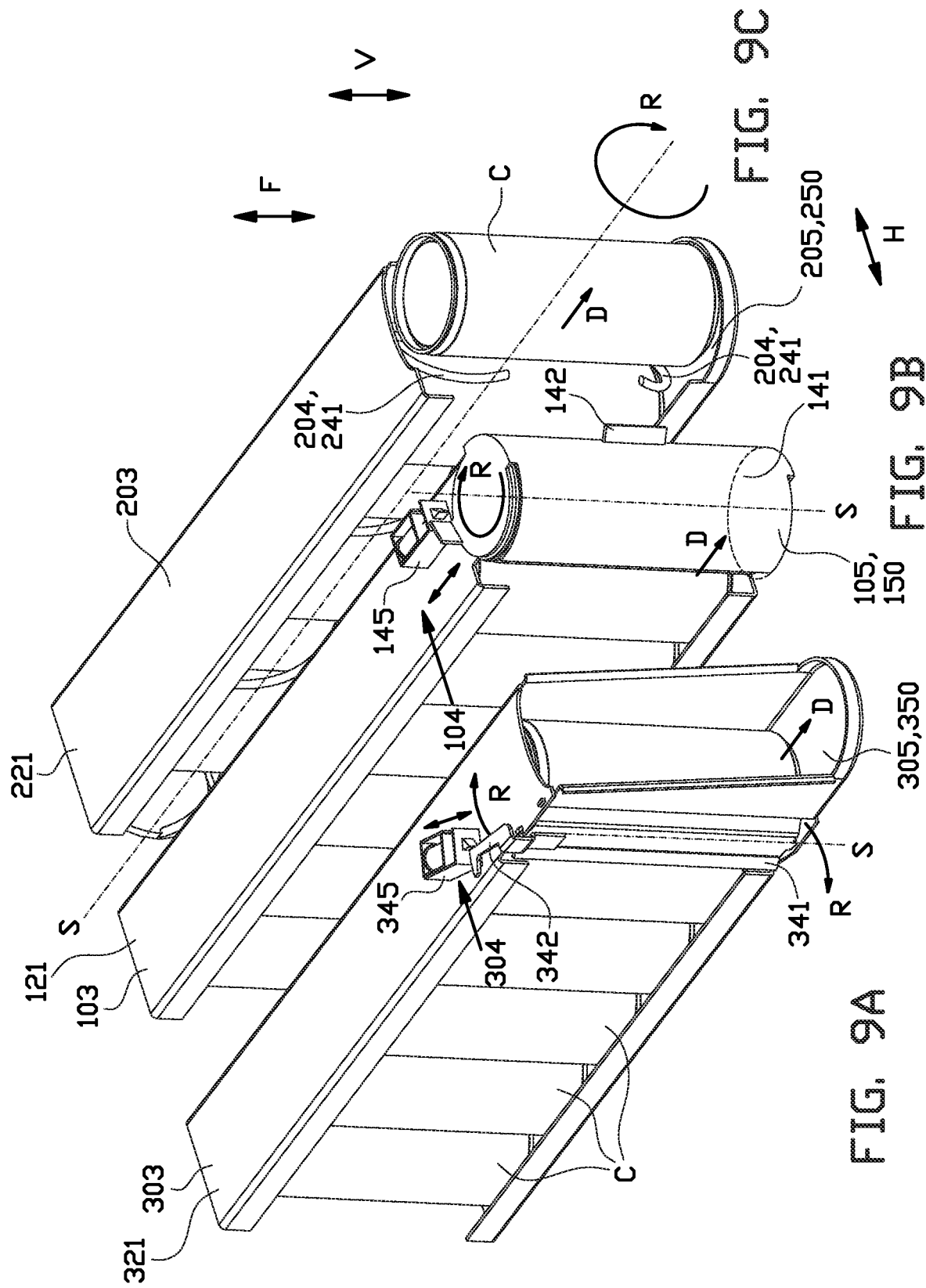
FIGS. 9A, 9B and 9C isometric views of three dispensing mechanism variations.

As best seen in FIGS. 7 and 9B, the dispensing mechanism 104 further comprises a separator member 141 that is movable between a receiving position for receiving said one product C in the dispensing direction D from the product holder 103 and a separating position for separating said one product C from the plurality of products C that remain in the product holder 103. In this exemplary embodiment, the separator member 141 is formed as a revolving door that forms a chamber for receiving said one product C. The revolving door is rotatable (see arrow R) about a rotation axis S. The revolving door may be provided with a handle 142 to facilitate manual operation.

The dispensing mechanism 104 further comprise a blocking member 145 that is movable between a blocking position for blocking the movement of the separator member 141 from the receiving position into the separating position and an unblocking position for allowing the movement of the separator member from the receiving position into the separating position. The separator member 141 may be provided with a protrusion 143 that crosses with the path of the blocking member 145 during the rotation R.

The alternative vending kit 101 further comprises a collection member 105 in front of the product holder 103 in the dispensing direction D, to receive said one product C after it has been dispensed. In this case, the collection member 105 may be formed by the separator member 141. In particular, the revolving door of the separator member 141 together with a circular platform or tray 150 at the bottom of said separator member 141 may form the collection area for said one product C.

Figure 8:
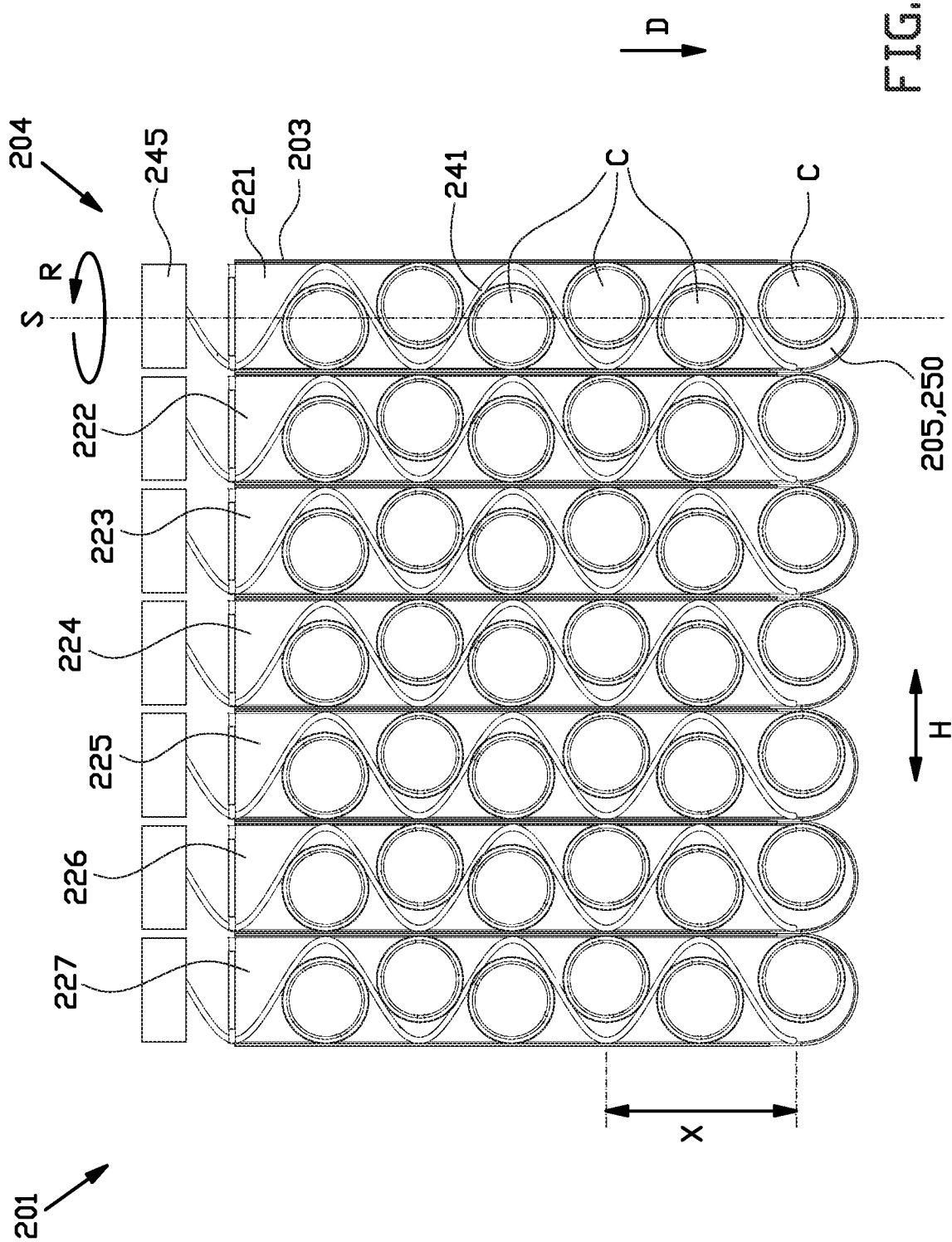
FIG. 8 shows a top view in cross section of a further alternative vending kit according to a third embodiment of the invention.

FIGS. 8 and 9C show a further alternative vending kit 201 according to a third embodiment of the invention. The further alternative vending kit 201 has a similar configuration to the alternative vending kit 101 according to the second embodiment of the invention, i.e. a number of dispenser modules 221-227 with product holders 203 for holding the products C, in this example beverage cans C, in an upright orientation. The further alternative vending kit 201 differs from the previously discussed vending kits 1, 101 in that the dispensing mechanism 204 comprises a dispensing spiral 241 and a spiral drive 245 that is arranged to drive the dispensing spiral 241 in a rotation (see arrow R) about a spiral axis S. The dispensing spiral 241 comprises a plurality of helical windings spaced apart in the dispensing direction D over a pitch distance X. The spiral drive 245 is arranged for rotating the dispensing spiral 241 over half the pitch distance X at a time, i.e. in response to a payment at the payment module 62. As shown in FIG. 9C, a collection member 205, i.e. a collection tray or platform, may be provided at the end of the dispensing spiral 241 to form a collection area 250 for the dispensed product C.

FIG. 9A shows an alternative first dispenser module 321 which is a combination of the dispensing mechanism 304 according to the first embodiment of the invention and the product holder 303 according to the second embodiment of the invention. In particular, the dispensing mechanism 304 comprises a lever-style retaining member 341 with an arm 342 that is blocked by a solenoid driven blocking member 345 to selectively block and allow rotation R of the arm 342, and thus the retaining member 341 relative to the product holder 303. The product holder may be provided with a collection member 305 similar to the collection member 205 according to the third embodiment of the invention.

FIGS. 11A-11G and FIG. 12 show a further alternative vending kit 401 according to a fourth embodiment of the invention. The further alternative vending kit 401 differs from the previously discussed vending kits 1, 101, 201 in that its dispensing mechanism 404 is located at the bottom or the lower end of the product holder 403. In particular, the dispensing mechanism 404 comprises a retaining member 341 that is arranged to engage the products C from below.

As shown in FIG. 11A, the products C in this example are the same beverage cans C as described earlier The rigidity of this bottom rim 494 that is used advantageously in this embodiment of the invention to securely retain the beverage cans C inside the product holder 403 until a payment is made to release one of the beverage cans C from said product holder 403.

Figure 11B:
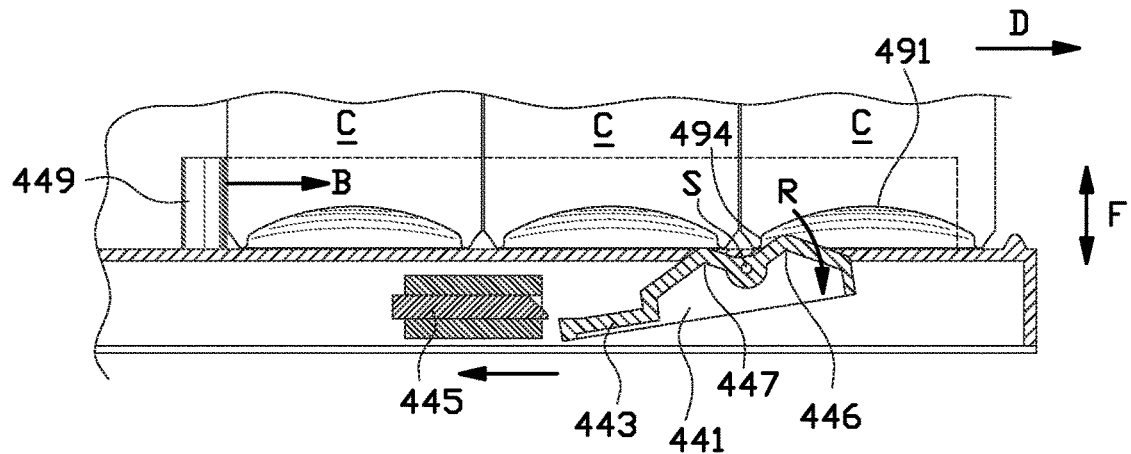
Figure 11C:
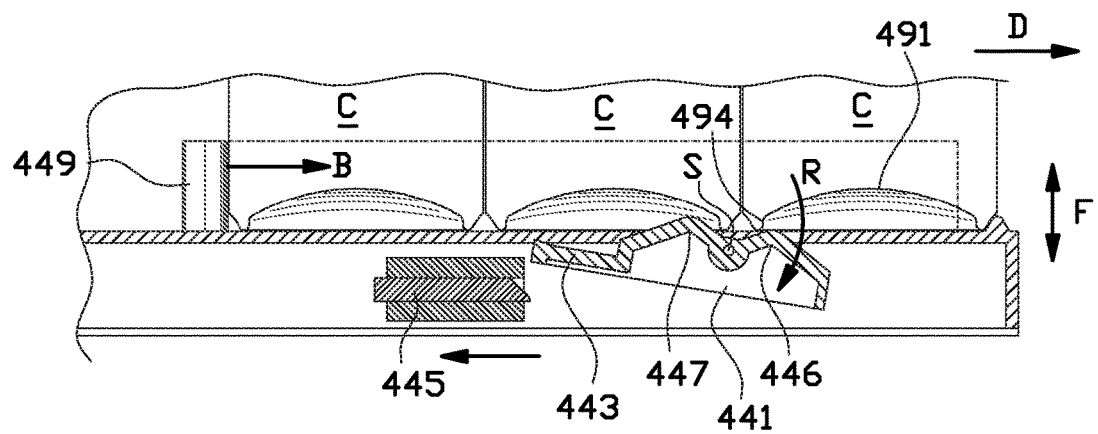
Figure 11D:
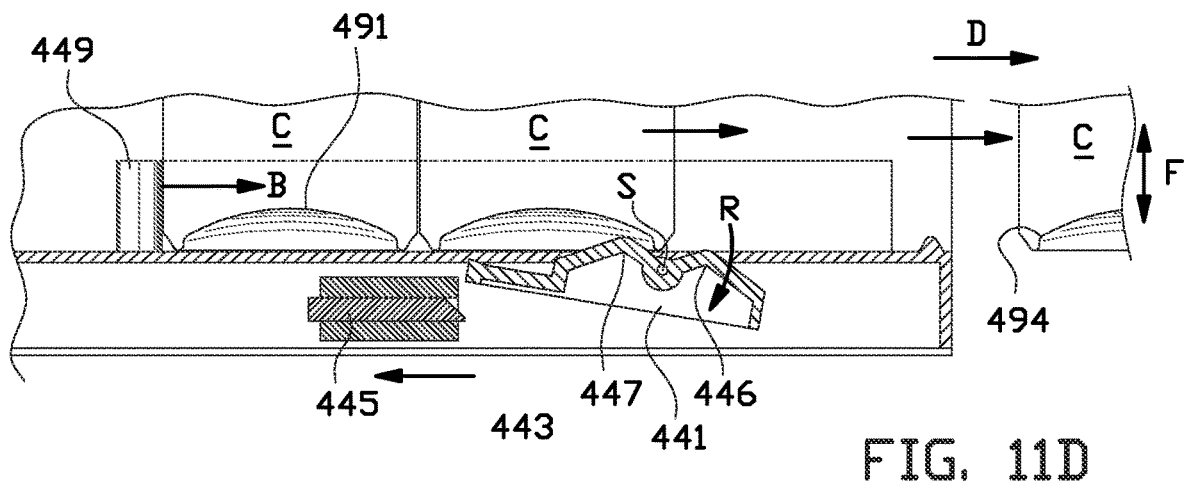
Figure 11E:
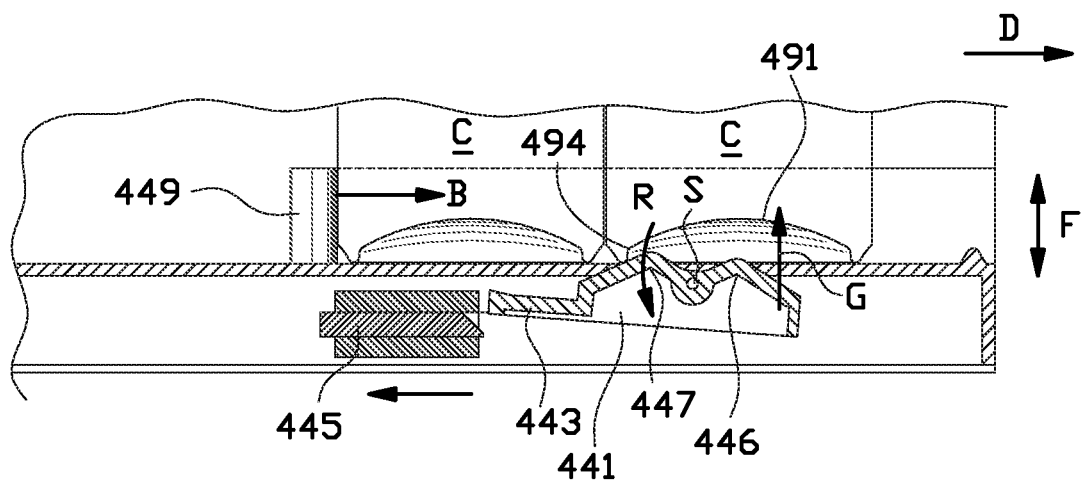
Figure 11F:
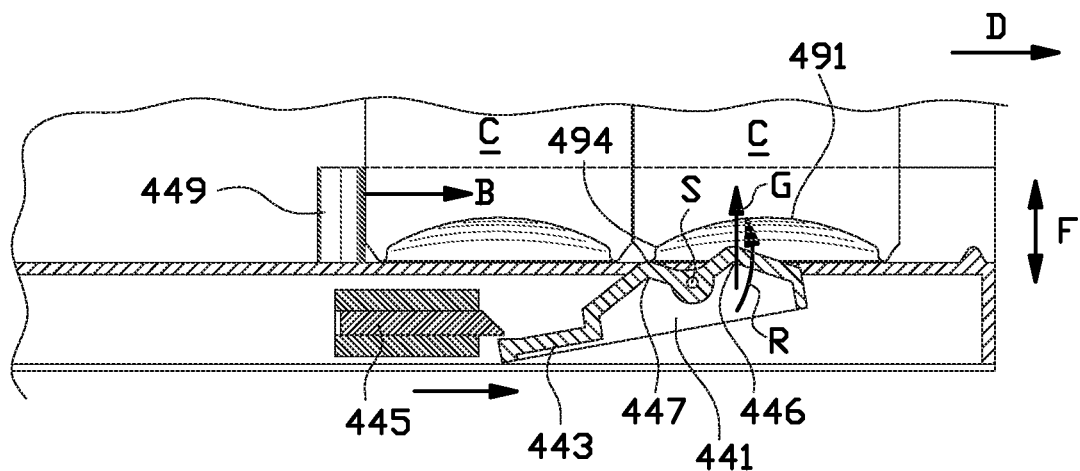
Figure 11G:
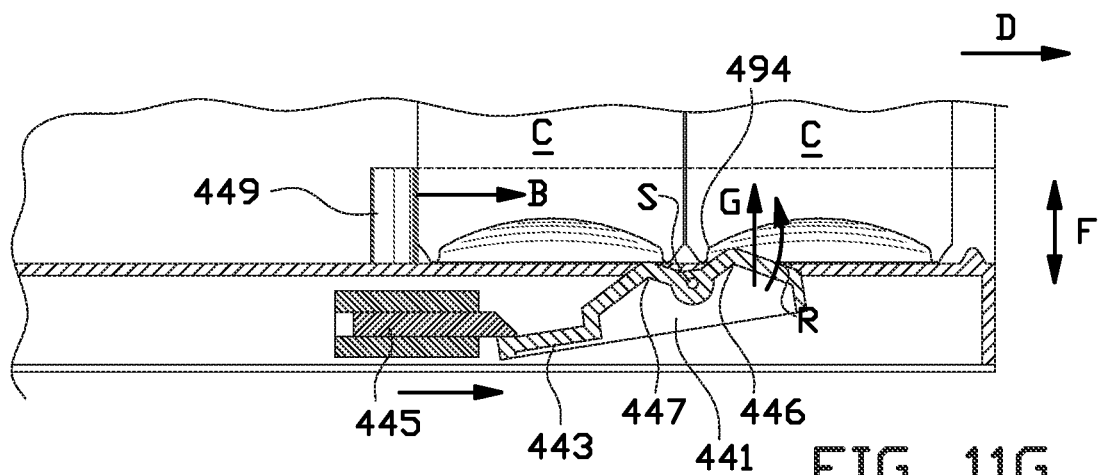

In this exemplary embodiment, the retaining member 441 is rotatable (see arrow R) about a horizontally extending rotation axis S between a retaining position, as shown in FIGS. 11A and 11G, and a release position, as shown in FIGS. 11C and 11D. It is noted that the retaining member 441 may alternatively be moved linearly, along or curve, or a combination thereof, provided that the movement comprises at least a vector component G in the production orientation direction E. The retaining member 441 has a retaining cam 446 that, in the retaining position, extends or protrudes into the bottom cavity created by the bottom 491 of the beverage can C in the production orientation direction E. In particular, the retaining cam 446 is arranged to be in the path of the bottom rim 494 of the beverage can C in the dispensing direction D. Because of the narrow fit of the beverage can C in the product holder 403, it is very difficult, if not impossible, to tilt the beverage can C and clear the retaining cam 446.

To prevent that the retaining cam 446 is moved out of the retaining position, the dispensing mechanism 404 comprises a blocking member 445, i.e. driven by a solenoid, that can move between a blocking position, as shown in FIGS. 11A, 11F and 11G, and an unblocking position, as shown in FIGS. 11B-11E. FIG. 11B shows that the blocking member 445 is retracted into the unblocking position in response to a successful transaction. The retaining member 441 is now free to rotate towards the release position. The first beverage can C in the product holder 403 is now ready to be dispensed. Preferably, the vending kit 401 is provided with a biasing member 449 that exerts a biasing force B onto the beverage cans C in the dispensing direction D. The biasing member 449 may for example be a spring, in particular a constant force spring.

The biasing member 449 ensures that the first beverage can C in the product holder 403 will always assume the position closest to the dispensing opening. From there, a consumer may manually pull the first beverage can C out of the product holder 403.

As the beverage can C crosses the retaining cam 446 of the retaining member 441, the contact between the bottom rim 494 and the retaining cam 446 will cause the retaining member 441 to rotate about the rotation axis S into a position in which the retaining member 441 is below the path of the beverage can C in the dispensing direction D, as shown in FIG. 11C. Hence, the beverage can C can be removed from the product holder 403.

FIG. 11D shows that the next beverage can C is advanced in the dispensing direction D as a result of the biasing force B. As shown in FIG. 11E, the retaining member 441 further comprises a auto-return cam or slope 447 that forces the retaining member 441 to return from the release position into the retaining position when the next beverage can C moves across the dispensing mechanism 404. In particular, FIG. 11E shows the next beverage can C in contact with the auto-return cam or slope 447 and FIG. 11F shows how the retaining member 441 has returned to the retaining position as result of said contact. In FIG. 11G, the blocking member 445 is moved into the blocking position again to block unauthorized rotation of the retaining member 441 towards the release position.

In this particular example, the retaining member 441 comprises a protrusion 443 that crosses with the path of the blocking member 445 during the rotation R. The protrusion 443 is located below the path of the blocking member 445 when the retaining member 441 is in the retaining position and above the path of the blocking member 445 when the retaining member 441 is in the release position. Once the protrusion 443 is located below the path of the blocking member 445, the blocking member 445 can be moved into the blocking position, as shown in FIGS. 11A and 11G. The dispensing mechanism 404 is fully enclosed by the housing and is not easily accessible from the outside, thereby preventing tampering with the vending kit 401.

Figure 12:
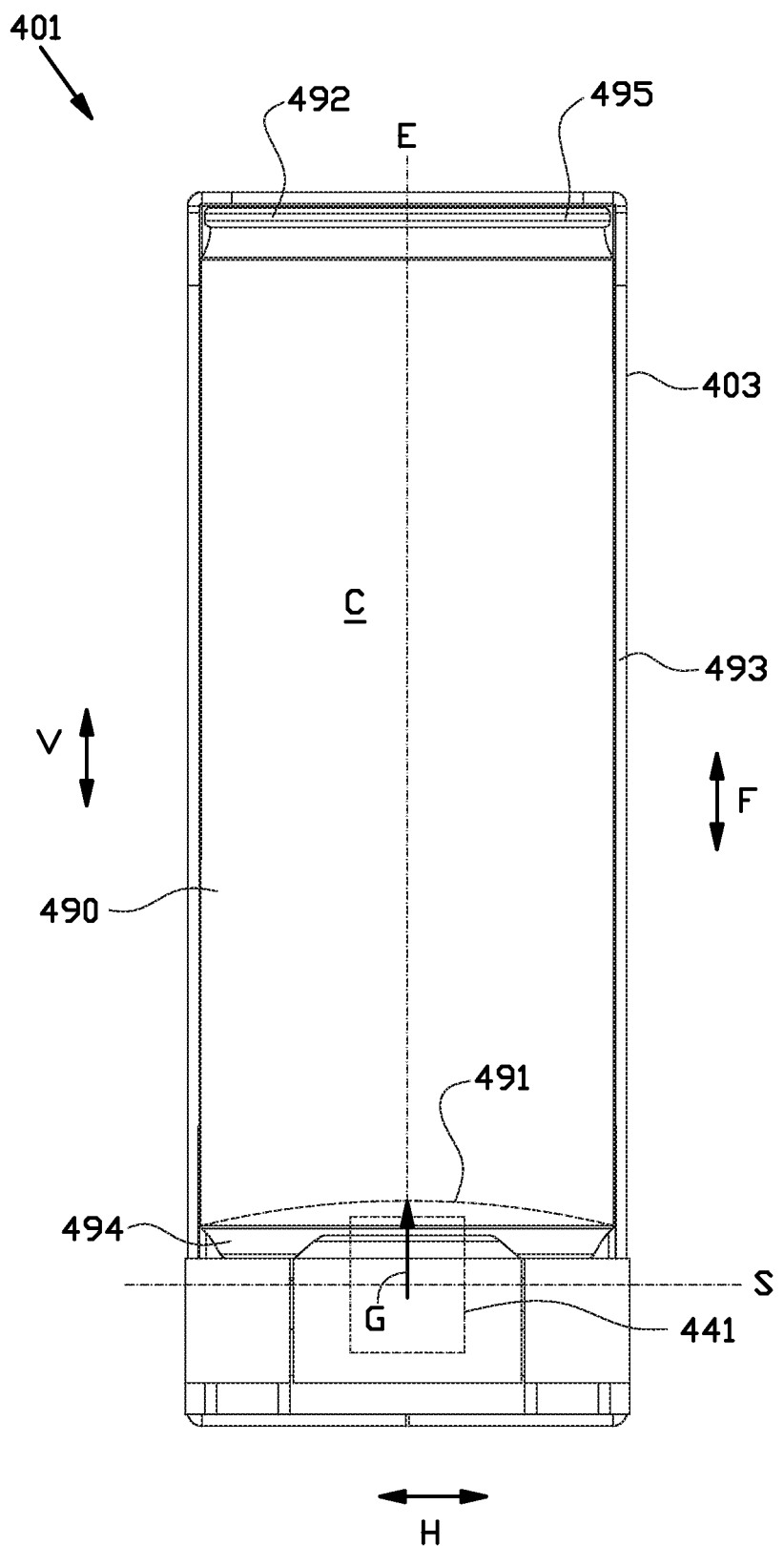
FIG. 12 shows a front view of the further alternative vending kit according to FIGS. 11A-11G.

As shown in FIG. 12, the product holder 403 is arranged for holding the beverage cans C in a single file. The width of the product holder 403 is only marginally wider than the width of the beverage cans C. The dispensing mechanism 404 can be fitted completely within the width of the product holder 403 underneath the beverage cans C. Hence, the dispenser module can be more compact compared to the embodiments in which the dispensing mechanism 404 is located at least partially at the side of the product holder. In case of a modular arrangement with several dispenser modules arranged adjacent to each other, it will be clear that the space saved by placing the dispensing mechanism 404 underneath the product holder 403 allows for one or more additional dispenser modules to be fitted—widthwise—in the same space.

It will further be clear that the dispensing mechanism 404 may alternatively be fitted at the top of the product holder 403 in substantially the same way, provided that the top rim or flange 495 at the top 492 of the beverage can C provides sufficient space to securely retain the beverage cans C within the product holder 403.

It is to be understood that the above description is included to illustrate the operation of the preferred embodiments and is not meant to limit the scope of the invention.

In particular, it will be clear that many variations and combinations are possible in terms of the dispensing mechanism, the configuration of the product holders and the ways of payments, as already reflected in the various embodiments as shown. From the above discussion, many variations will be apparent to one skilled in the art that would yet be encompassed by the scope of the present invention.

Moreover, although the vending kit according to the present invention is adapted for use in a refrigerator and has no cooling means of its own, it will be clear that the dispenser module, and in particular the dispensing mechanism thereof, may also be applied independently to vending kits for use outside of a refrigerator, i.e. as part of a compact vending apparatus with its own cooling means. Hence, the dispenser module and/or the dispensing mechanism can be made subject of divisional applications independently of the application of the vending kit in a refrigerator.

The invention claimed is:

1. A first dispenser module with a product holder for holding a plurality of beverage cans and a dispensing mechanism that is coupled to the product holder for dispensing one beverage can of the plurality of beverage cans at a time in a dispensing direction from the product holder, wherein each beverage can has a cylindrical body with a top, a bottom and a central axis extending at the heart of the cylindrical body between the top and the bottom, wherein each beverage can further comprises a top rim and a bottom rim at the top and the bottom, respectively, wherein the product holder defines a product orientation direction and is arranged for holding the plurality of beverage cans with their central axes parallel to said product orientation direction, wherein the product holder is provided with an enclosure that encloses the plurality of beverage cans and a dispensing opening in said enclosure for dispensing the one beverage can that is in the position closest to the dispensing opening in the dispensing direction from the product holder, wherein the dispensing mechanism comprises a retaining cam that is movable with at least a vector component in the production orientation direction between a retaining position for retaining the plurality of beverage cans in the product holder and a release position for releasing the one beverage can that is in the position closest to the dispensing opening from the product holder;

wherein the bottom of each beverage can forms a bottom cavity, wherein the bottom rim extends circumferentially around said bottom cavity, wherein the retaining cam, in the retaining position, is arranged to extend into the bottom cavity of the one of beverage can that is in the position closest to the dispensing opening such that the retaining cam is in the path of the bottom rim of said one beverage can in the dispensing direction; or wherein the top of each beverage can forms a top cavity, wherein the top rim extends circumferentially around said top cavity, wherein the retaining cam, in the retaining position, is arranged to extend into the top cavity of the one beverage can that is in the position closest to the dispensing opening such that the retaining cam is in the path of the top rim of said one beverage can in the dispensing direction.

2. A method for dispensing one beverage can at a time from the first dispenser module according to claim 1, wherein the method comprises the step of retaining the one beverage can that is in the position closest to the dispensing opening at the top or the bottom of said one beverage can.

3. The first dispenser module according to claim 1, wherein the enclosure is open in the dispensing direction only.

4. The first dispenser module according to claim 1, wherein the product holder is arranged to prevent removal of the plurality of beverage cans in all directions but the dispensing direction.

5. The first dispenser module according to claim 1, wherein the product orientation direction is vertical.

6. The first dispenser module according to claim 1, wherein the dispensing mechanism further comprises a blocking member that is movable between a blocking position for blocking the movement of the retaining cam from the retaining position into the release position and an unblocking position for allowing the movement of the retaining cam from the retaining position into the release position.

7. The first dispenser module according to claim 1, wherein the product holder has a width that is arranged to hold the plurality of products in a single file in the dispensing direction, wherein the dispensing mechanism fits completely within the width of the product holder.

8. The first dispenser module according to claim 1, wherein the retaining cam is biased to return from the release position into the retaining position when said one product has been dispensed.

9. The first dispenser module according to claim 8, wherein the retaining cam comprises an auto-return cam or slope that is arranged in the dispensing direction in the path of a next product of the plurality of products in the product holder, wherein the auto-return cam or slope is arranged to force the retaining cam to return from the release position towards or into the retaining position when the next product advances in the dispensing direction into contact with and across the auto-return cam or slope.

10. The first dispenser module according to claim 6, wherein the blocking member is an electronic actuator, preferably a solenoid.

11. The first dispenser module according to claim 1, wherein the dispensing mechanism further comprises a biasing member for biasing the plurality of products in the dispensing direction.

12. The first dispenser module according to claim 11, wherein the biasing member is a spring.

13. The vending kit for a refrigerator, wherein the vending kit comprises the first dispenser module according to claim 1.

14. The vending kit according to claim 13, wherein the first dispenser module is insertable into and removable from the vending kit like a cartridge.

15. The vending kit according to claim 13, wherein the vending kit comprises one or more further dispenser modules, wherein the one or more further dispenser modules are arranged to be placed adjacent to the first dispenser module in a horizontal direction and/or a vertical direction.

16. A refrigerator fitted with the vending kit according to claim 13.

17. The method for vending a plurality of beverage cans from a first dispenser module with the use of a vending kit according to claim 1, wherein the method comprises the steps of inserting the first dispenser module into and removing the first dispenser module from the vending kit like a cartridge.

18. The method according to claim 17, wherein the vending kit comprises one or more further dispenser modules, wherein the method comprises the step of placing one or more of the further dispenser modules adjacent to the first dispenser module in a horizontal direction and/or a vertical direction.

19. The method according to claim 18, wherein the thermally insulated compartment of the refrigerator comprises two mutually facing sidewalls and a plurality of shelves extending in a horizontal direction between said sidewalls to divide the thermally insulated compartment in a plurality of sections, wherein the number of the one or more further dispenser modules is chosen such that the group of the first dispenser module and the one or more further dispenser modules fits in one of said sections.

* * * * *